G. EPPRECHT.
FRYING PAN.
APPLICATION FILED JAN. 6, 1916.

1,216,973.  Patented Feb. 20, 1917.

WITNESSES

INVENTOR
G. Epprecht
BY
ATTORNEYS

UNITED STATES PATENT OFFICE.

GOTTLIEB EPPRECHT, OF ALLENTOWN, PENNSYLVANIA.

FRYING-PAN.

1,216,973.

Specification of Letters Patent.

Patented Feb. 20, 1917.

Application filed January 6, 1916. Serial No. 70,667.

*To all whom it may concern:*

Be it known that I, GOTTLIEB EPPRECHT, a citizen of Switzerland, and a resident of Allentown, in the county of Lehigh and State of Pennsylvania, have invented certain new and useful Improvements in Frying-Pans, of which the following is a specification.

My invention relates to frying pans and the like, and the main object thereof is to provide such a utensil wherein a constant and adequate supply of fat is insured to prevent scorching the food being fried, regardless of the deviation from horizontal of the bottom of the pan.

My invention is fully described in the following specification, of which the following drawings form a part, in which like characters refer to like parts in each of the views, and in which—

Figure 1:
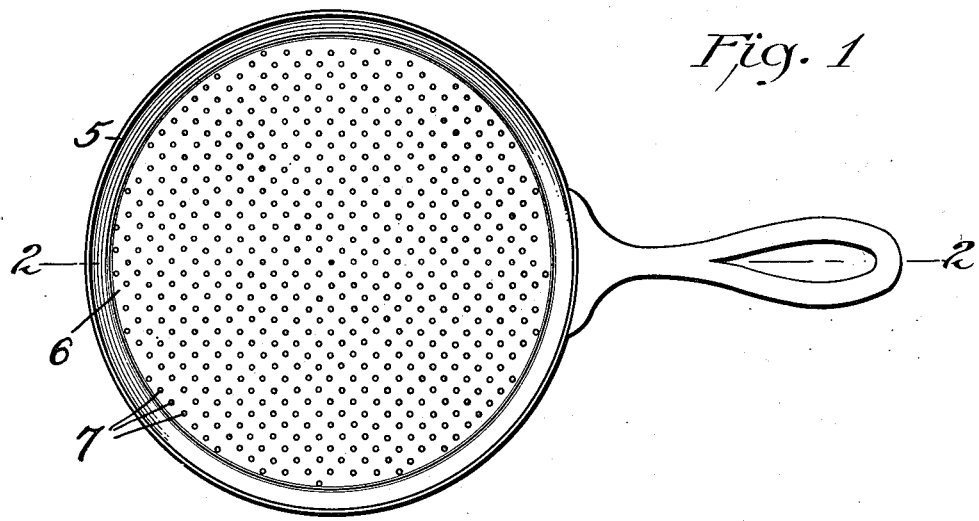
Figure 1 is a top plan view of a frying pan constructed in accordance with my invention.
Figure 2:
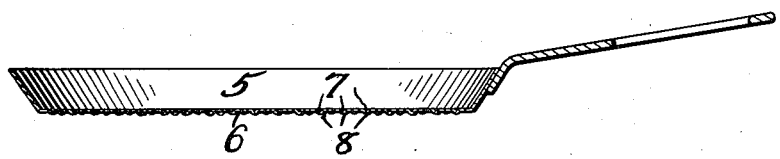
Fig. 2 is a section taken on the line 2—2 of Fig. 1.
Figure 3:
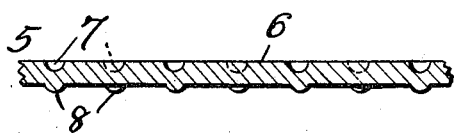
Fig. 3 is an enlarged fragmentary section, similar to Fig. 2.
Figure 4:
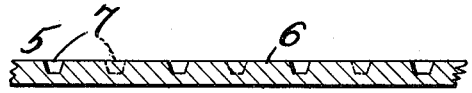
Fig. 4 is a view similar to Fig. 3 but showing a modification thereon.

In the drawings forming a part of this application I have shown a frying pan 5 of conventional or any desired form with the exception that the bottom 6 thereof is provided with a plurality of closely arranged, minute, depressions 7 serving as wells for fat used in frying food, eggs, cakes, etc., these depressions being in the upper surface of the bottom 6.

These depressions may be formed by stamping whereby bosses 8 are formed on the bottom of the pan, or they may be formed in the upper surface of the bottom 6 only when the pan is formed by casting and without the bosses 8, these latter forming no part of my invention and, when formed as by stamping, a flat false bottom may be secured beneath the bottom 6, although this is not shown in the drawings as I may or may not use the same.

In the use of frying pans it frequently occurs that an inadequate or uneven supply of fat is provided over the upper surface of the bottom 6, with the result that the food being fried is scorched in places, and it was in order to overcome this fault that my invention was conceived.

With the wells 7 closely arranged an even distribution of fat is assured over the entire bottom 6 even though the pan be inclined from the proper horizontal position, as frequently occurs, and, when the food is placed in the pan, the fat in these wells, or a portion thereof, is forced over the flat surface of the bottom 6 between the wells, thereby preventing the highly undesirable scorching referred to.

These wells, while minute, may be made of any desired configuration, and they may be arranged in desired designs, or arranged to form the names of business houses, etc., the particular arrangement thereof being arbitrary providing the function thereof is not interfered with.

When food is fried in a pan of my construction the portions thereof in the positions of the wells assume a lighter shade of color than the other portions, thereby rendering the arrangement of the wells clearly apparent on the fried food, this being due to the excess of fat in the wells over the fat on the flat surface of the pan, and mottoes, pictures, advertising matter, etc., may thus be brought to the attention of the party to whom the food is served.

My invention therefore consists in the provision of a multitude of minute depressions in the frying surface of a utensil of this type or class to serve as wells for fat to insure an adequate and even supply over the entire frying surface of the utensil, and the utensil may be made in any form, of any desired material, and may be used for any purpose where such a supply of fat is desirable.

Having fully described my invention, what I claim as new, and desire to secure by Letters Patent, is:—

1. A frying pan or the like provided with a multitude of closely arranged minute depressions in the frying surface serving as wells for fats to insure an adequate supply and even distribution over the entire frying surface.

2. A frying pan or the like, provided with a multitude of minute depressions arranged in a suitable design in the frying surface, and serving as reservoirs for fat.

3. A frying pan or the like, provided with a multitude of minute depressions closely arranged in the frying surface and forming bosses beneath said surface, said depressions serving as reservoirs for fat.

In testimony whereof I have signed my name to this specification in the presence of two subscribing witnesses.

GOTTLIEB EPPRECHT.

Witnesses:
 GEZA V. ALBRECHT,
 GEZA BOLEZ.